United States Patent
Drummond et al.

(10) Patent No.: US 12,079,909 B1
(45) Date of Patent: Sep. 3, 2024

(54) SHOWING LAST-SEEN TIME FOR FRIENDS IN AUGMENTED REALITY (AR)

(71) Applicant: Snap Inc., Santa Monica, CA (US)

(72) Inventors: Virginia Drummond, Venice, CA (US); Celia Nicole Mourkogiannis, Los Angeles, CA (US); Ibrahem Shekoni, Santa Monica, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 17/565,295

(22) Filed: Dec. 29, 2021

Related U.S. Application Data

(60) Provisional application No. 63/132,966, filed on Dec. 31, 2020.

(51) Int. Cl.
*G06T 11/60* (2006.01)
*G06F 3/04817* (2022.01)

(52) U.S. Cl.
CPC .......... *G06T 11/60* (2013.01); *G06F 3/04817* (2013.01); *G06T 2200/24* (2013.01)

(58) Field of Classification Search
CPC . G06T 11/60; G06T 2200/24; G06F 3/04817; G06F 3/04845
See application file for complete search history.

(56) References Cited

U.S. PATENT DOCUMENTS

| | | | |
|---|---|---|---|
| 2007/0129112 A1* | 6/2007 | Tarn | H04M 1/72436 455/566 |
| 2011/0099486 A1* | 4/2011 | Nesladek | G01C 21/367 709/204 |
| 2015/0186538 A1* | 7/2015 | Yan | G06F 40/12 707/722 |
| 2016/0050165 A1* | 2/2016 | Thomas | G06Q 10/10 715/752 |
| 2018/0197343 A1* | 7/2018 | Hare | G06F 3/011 |
| 2019/0222806 A1* | 7/2019 | Soppelsa | H04N 5/272 |
| 2021/0042021 A1* | 2/2021 | Smith | H04N 23/80 |
| 2022/0070385 A1* | 3/2022 | Van Os | H04N 5/2621 |

* cited by examiner

*Primary Examiner* — William A Beutel
(74) *Attorney, Agent, or Firm* — Schwegman Lundberg & Woessner, P.A.

(57) ABSTRACT

In one example, a method includes causing presentation of a camera interface, the camera interface displaying a first image captured by a camera of a computing device of a first user of an interaction system, identifying a set of users of the interaction system that are associated with the first user, determining a subset of the set of users that have been active on the interaction system within a determinable time period, causing presentation, within the camera interface, of a graphical element for each user of the subset of users, each graphical element being user-selectable to invoke an augmentation mechanism, detecting user selection of a first graphical element associated with a second user of the subset, and causing presentation, within the camera interface and responsive to the detection of the user selection of the first graphical element, of an augmentation of the first image to generate augmented image.

15 Claims, 10 Drawing Sheets

SHOWING LAST-SEEN TIME FOR FRIENDS IN AUGMENTED REALITY (AR)

CROSS-REFERENCE TO RELATED APPLICATION

This patent application claims the benefit of U.S. Provisional Patent Application No. 63/132,966, filed Dec. 31, 2020, entitled "SHOWING LAST-SEEN TIME FOR FRIENDS IN AUGMENTED REALITY (AR)", which is incorporated by reference herein in its entirety.

BACKGROUND

A number of messaging and collaboration platforms provide presence indication with respect to users, whereby users may be notified of the presence of further users on the collaboration platform. However, actions responsive to such present indications may be limited to traditional responses and actions, and a user may not be thus incentivized to reach out to colleagues or friends on a collaboration platform. A number of technical challenges exist with respect to lowering the communication barriers and facilitating easier and more personalized interactions and collaborations between users.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some non-limiting examples are illustrated in the figures of the accompanying drawings in which.

DETAILED DESCRIPTION

An example interaction system is described that enables the initiation and sharing of augmented reality (AR) experiences between users of the interaction system. The described example augmented reality (AR) technology conveniently enables users to share personalized and augmented digital content (e.g., still or video images) using a mechanism that provides an improved person-machine interface. Further, the described example technology deploys automation to automatically detect and present digital content for sharing between users.

User Interfaces

Figure 1:
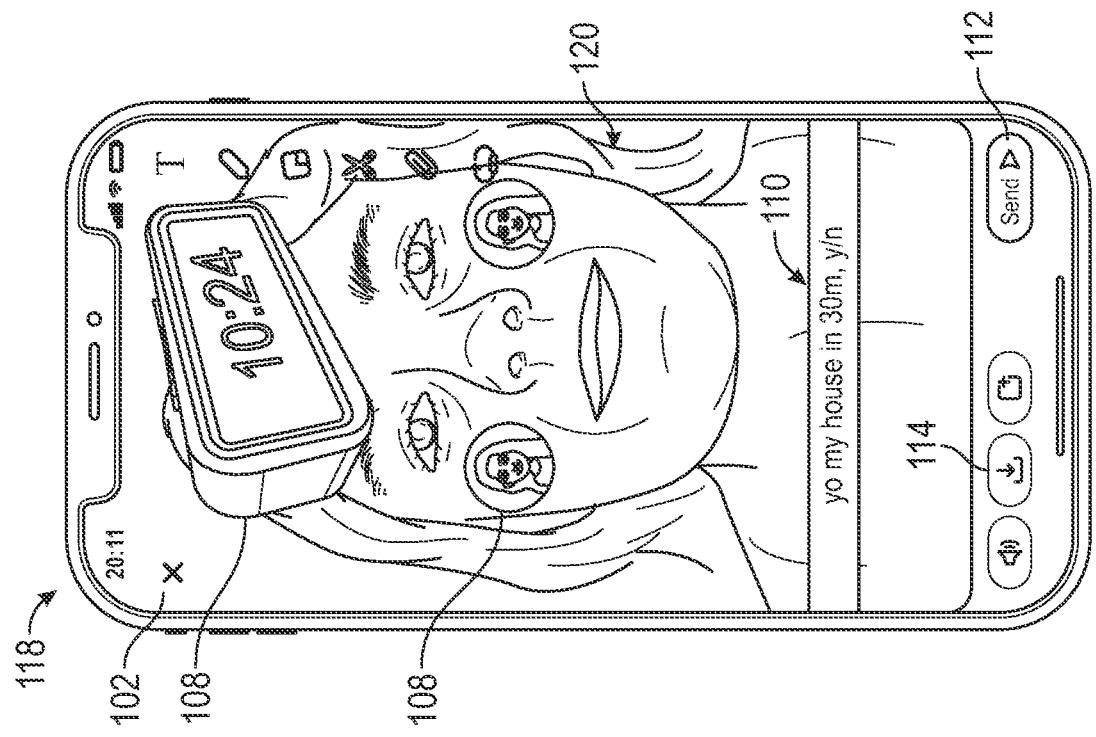
FIG. 1 illustrates an aspect of the subject matter in accordance with some examples.
Figure 1:
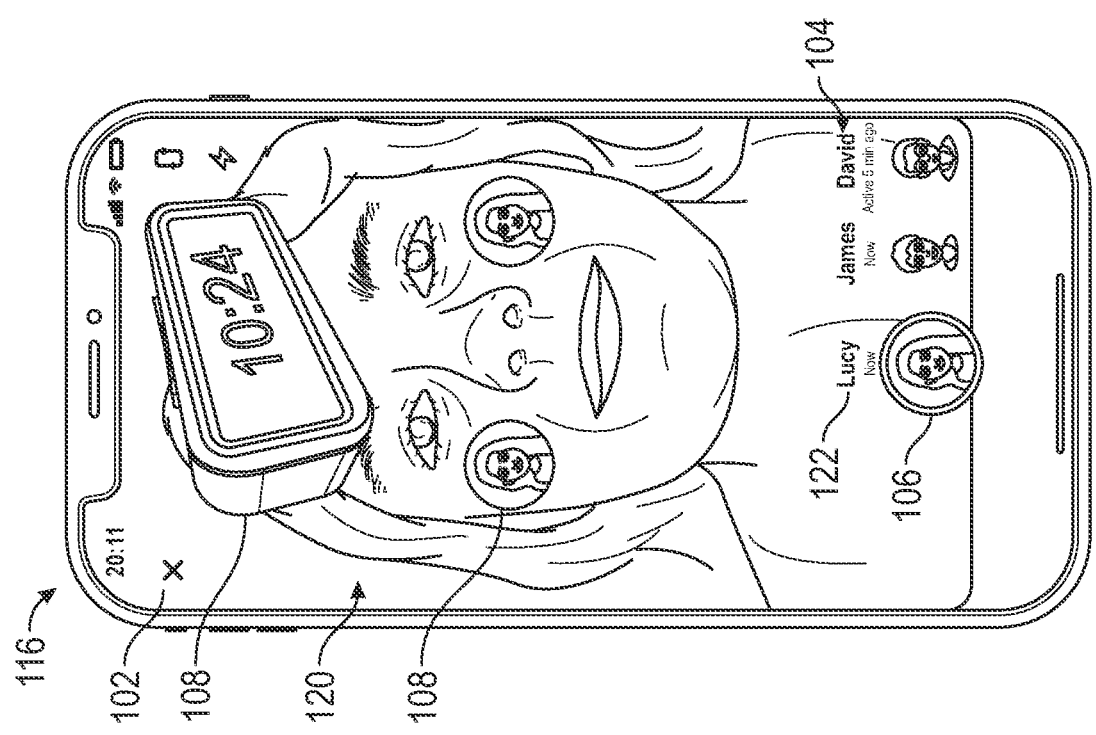

FIG. 1 is a user interface diagram showing screenshots of an example camera interface 102 that may be presented on a client device 302 (e.g., a mobile phone) by an interaction client 304 (e.g., a communications or social networking app) executing on the client device 302. The camera interface 102 operationally displays real-time digital content (e.g., still or video image images 120), which can be captured and stored or transmitted in a video stream or as the payload in a message. The images 120 displayed within the camera interface 120 are captured by a camera that forms part of (or is coupled to) the client device. For example, where the client device 302 is a mobile phone, real-time images 120 are captured by a front-facing camera of the mobile phone and streamed to a display of the mobile phone for display by the interaction client 304, within the context of the camera interface 102.

The camera interface 102 also includes a rotatable filter carousel 104 of augmentation icons, in the example form of avatar icon 106, which are presented within the camera interface for user selection. Each of the avatar icon 106 is associated with a user of an interaction system 300 (e.g., a messaging or social networking system) and includes an avatar representation of the associated user. A set of avatar icon 106 are automatically selected for display within the filter carousel 104 based on the activity of the associated user. The interaction system 300 identifies a set of users, associated with a viewing user logged into the interaction client 304, that have been active on the interaction system 300 most recently. For example, a ranked list of "friends" of a viewing user, recognized by the interaction system 300 as being connected or related to the viewing user, may be generated based on timestamps of a last activity (e.g., logging in, sending a message or other action on the interaction system 300) of the respective user. This ranked list of users associated with the user may furthermore be continually updated based on activity, or lack of activity, by the associated users. The interaction system 300 may monitor for any new activity by "friends" of a viewing user, and dynamically update the ranked list based on the currency (e.g., determined by timestamps) of such activities. The composition and order of the set of avatar icon 106 presented within the carousel 104 is then automatically updated, based on such detected activities. For example, when a "friend" of the viewing user becomes active on the interaction system 300, and avatar icon 106 associated with that user may be placed at an appropriate position (e.g., the centered activation position) within the carousel 104. As such, the ordering of the avatar icon 106 within the carousel 104 may reflect the currency of activities, determined by timestamps, of friends of the viewing user. In some examples, the avatar icon 106 may be updated in near real-time to indicate activity on the interaction system 300 by an associated user. For example, a border or "flare" may be applied to the relevant avatar icon 106 to indicate current activity.

In addition to being associated with a user (or group of users), each of the avatar icon 106 is also associated with a respective image augmentation mechanism (e.g., an image filter) that is invoked by user selection (e.g., by tapping on the screen of the client device 302) of the associated avatar icon 106. In one example, the avatar icon 106 displayed at the horizontally center position of the carousel 104 is selectable to invoke the associated image filter. In other examples, rotating a particular avatar icon 106 to an activation position (e.g., a horizontally centered position) automatically invokes and activates the associated image filter. A user rotates the filter carousel 104 by performing a swipe operation, applied to the screen of the client device 302, in either the left or the right direction, so as to rotate the filter carousel 104. A user is also able to rotate the filter carousel 104 by selecting an off-center avatar icon 106, which will rotate the filter carousel 104 so as to place the selected avatar icon 106 in a horizontally centered position, at which location the associated image filter is automatically invoked. In other embodiments, a viewing user specifically selects (e.g., by using a tap gesture applied to the screen of the client device 302) a displayed avatar icon 106 to activate the associated image filter.

An avatar icon 106 displayed at the activation position (e.g., a position at or adjacent to the horizontal center of the camera interface 102) is furthermore visually distinguished (e.g., by a highlighted ring or border) from other avatar icons 106 to indicate that the associated image filter is active. Further, a user name, title, or other descriptive information 122 associated with the centered avatar icon 106 is displayed above the avatar icon 106. In the displayed example screenshot 116, the user name "Jane" is displayed above the centered avatar icon 106 as an example of such descriptive information 122.

Activation of an image filter associated with an avatar icon 106 results in presentation, within the camera interface 102, of an augmentation 108 (or multiple augmentations 108) that are applied as overlays or "stickers" to the image 120 (or sequence of images 120) in order to augment the image 120, which represents a real-time "reality" image feed from the camera of a client device 302. Presentation of the augmentation 108 results in the generation of a composite, augmented image within the camera interface 102, the composite image comprising the real-time image 120, and the augmentation 108.

The screenshot 116 shows an example augmentation in the form of an avatar of the user associated with the active avatar icon 106 (e.g., "Jane"), and a clock indicating a time derived from a timestamp associated with a most recent activity by "Jane" on the interaction system 300. In this way, the augmentation 108 is highly personalized with respect to "Jane."

By performing a selection operation on the active avatar icon 106, a viewing user is able to capture the composite image data shown in the camera interface 102 as either a composite still image or composite video, which can then be supplemented with textual information 110 as shown in the screenshot 118. The composite image data, together with the textual information 110, can then be sent by the viewing user to a recipient (e.g., "Jane") as a message by user selection of a send icon 112. The composite image data can also be stored (e.g., locally at the client device 302 and/or at an interaction server system 308), by user selection of a download icon 114.

Figure 2:
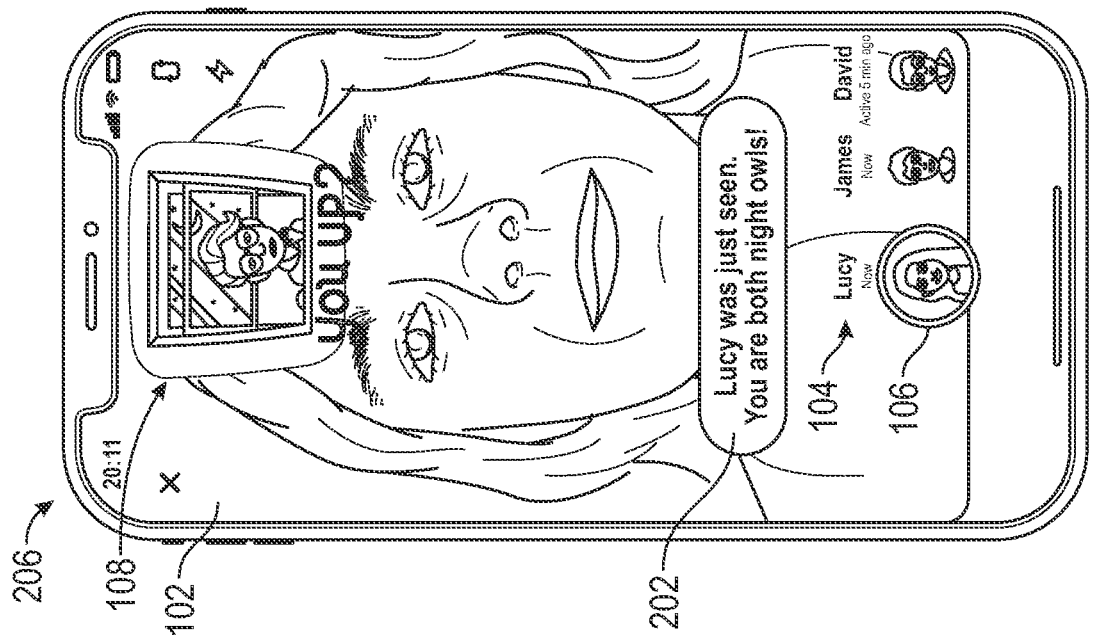
FIG. 2 illustrates an aspect of the subject matter in accordance with some examples.
Figure 2:
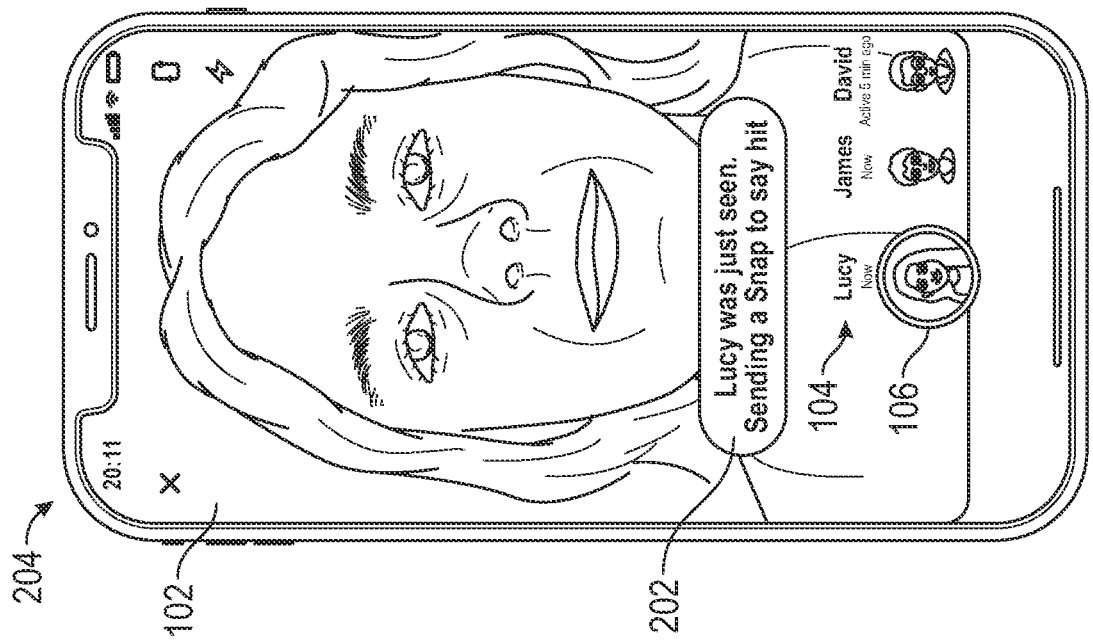

FIG. 2 is a user interface diagram showing to further screenshots of some examples of composite augmented reality (AR) images that may be generated by an interaction client 304, and presented within a camera interface 102 for capture, sharing, and saving. The screenshot 204 and screenshot 206 show the additional presentation of an activity notification 202 related to an active avatar icon 106 within the filter carousel 104. Specifically, the activity notification 202 communicates that "Jane was just seen. Sending a message to say hi!" The activity notification 202 is helpful to a viewing user and may be presented as a pop-up notification in order to prompt the viewing user to send a message, potentially including a composite, augmented reality (AR) image, to the newly active user (e.g., "Jane.")

By providing a dynamic and continually updating list of active users (e.g., "friends") on an interaction client 304 to a viewing user, the viewing user is provided with an example technical mechanism by which customized and personalized content is automatically presented to the viewing user to share with one or more currently active users. As such, the example technical mechanism may facilitate increased convenience in real-time communications between active users of an interaction system 300

Networked Computing Environment

Figure 3:
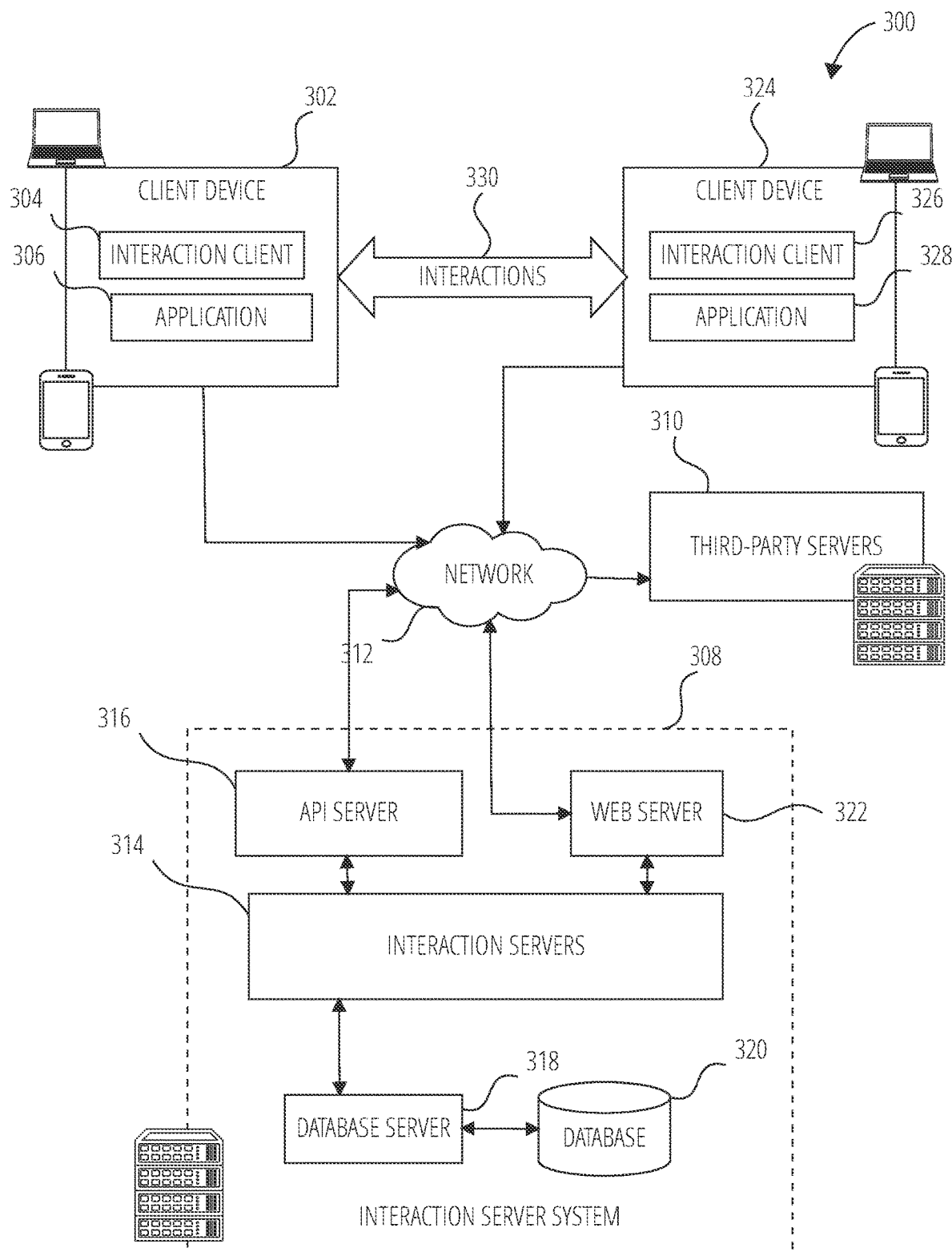
FIG. 3 is a diagrammatic representation of a networked environment in which the present disclosure may be deployed, in accordance with some examples.

FIG. 3 is a block diagram showing an example interaction system 300 for facilitating interactions (e.g., exchanging text messages, conducting text audio and video calls, or playing games) over a network. The interaction system 300 includes multiple instances of a client device 302, each of which hosts a number of applications, including an interaction client 304 and other applications 306. Each interaction client 304 is communicatively coupled, via a network 312 (e.g., the Internet), to other instances of the interaction client 304 (e.g., hosted on respective other client devices 302), an interaction server system 308 and third-party servers 310). An interaction client 304 can also communicate with locally-hosted applications 306 using Applications Program Interfaces (APIs).

An interaction client 304 is able to interact with other interaction clients 304 and with the interaction server system 308 via the network 312. The data exchanged between interaction clients 304, and between an interaction client 304 and the interaction server system 308, includes functions (e.g., commands to invoke functions) as well as payload data (e.g., text, audio, video or other multimedia data).

The interaction server system 308 provides server-side functionality via the network 312 to the interaction clients 304. While certain functions of the interaction system 300 are described herein as being performed by either an interaction client 304 or by the interaction server system 308, the location of certain functionality either within the interaction client 304 or the interaction server system 308 may be a design choice. For example, it may be technically preferable to initially deploy certain technology and functionality within the interaction server system 308 but to later migrate this technology and functionality to the interaction client 304 where a client device 302 has sufficient processing capacity.

The interaction server system 308 supports various services and operations that are provided to the interaction clients 304. Such operations include transmitting data to, receiving data from, and processing data generated by the interaction clients 304. This data may include message content, client device information, geolocation information, media augmentation and overlays, message content persistence conditions, social network information, and live event information, as examples. Data exchanges within the interaction system 300 are invoked and controlled through functions available via user interfaces (UIs) of the interaction clients 304.

Turning now specifically to the interaction server system 308, an Application Program Interface (API) server 316 is coupled to, and provides a programmatic interface to, interaction servers 314. The interaction servers 314 are communicatively coupled to a database server 318, which facilitates access to a database 320 that stores data associated with interactions processed by the interaction servers 314. Similarly, a web server 322 is coupled to the interaction servers 314, and provides web-based interfaces to the interaction servers 314. To this end, the web server 322 processes incoming network requests over the Hypertext Transfer Protocol (HTTP) and several other related protocols.

The Application Program Interface (API) server 316 receives and transmits interaction data (e.g., commands and message payloads) between the client device 302 and the interaction servers 314. Specifically, the Application Program Interface (API) server 316 provides a set of interfaces (e.g., routines and protocols) that can be called or queried by the interaction client 304 in order to invoke functionality of the interaction servers 314. The Application Program Interface (API) server 316 exposes various functions supported by the interaction servers 314, including account registration, login functionality, the sending of interaction data via the interaction servers 314, from a particular interaction client 304 to another interaction client 304, the communication of media files (e.g., images or video) from an interaction client 304 to the interaction servers 314, the settings of a collection of media data (e.g., a story), the retrieval of a list of friends of a user of a client device 302, the retrieval of messages and content, the addition and deletion of entities (e.g., friends) to an entity graph (e.g., a social graph), the location of friends within a social graph, and opening an application event (e.g., relating to the interaction client 304).

The interaction servers 314 host a number of systems and subsystems, describe below with reference to FIG. 4.

Returning to the interaction client 304, features and functions of an external resource (e.g., an application 306 or applet) are made available to a user via an interface of the interaction client 304. In this context, "external" refers to the fact that the application 306 or applet is external to the interaction client 304. The external resource is often provided by a third party but may also be provided by the creator or provider of the interaction client 304. The interaction client 304 receives a user selection of an option to launch or access features of such an external resource. The external resource may be the application 306 installed on the client device 302 (e.g., a "native app"), or a small-scale version of the application (e.g., an "applet") that is hosted on the client device 302 or remote of the client device 302 (e.g., on third-party servers 310). The small-scale version of the application includes a subset of features and functions of the application (e.g., the full-scale, native version of the application) and is implemented using a markup-language document. In one example, the small-scale version of the application (e.g., an "applet") is a web-based, markup-language version of the application and is embedded in the interaction client 304. In addition to using markup-language documents (e.g., a .*ml file), an applet may incorporate a scripting language (e.g., a .*js file or a .json file) and a style sheet (e.g., a .*ss file).

In response to receiving a user selection of the option to launch or access features of the external resource, the interaction client 304 determines whether the selected external resource is a web-based external resource or a locally-installed application 306. In some cases, applications 306 that are locally installed on the client device 302 can be launched independently of and separately from the interaction client 304, such as by selecting an icon, corresponding to the application 306, on a home screen of the client device 302. Small-scale versions of such applications can be launched or accessed via the interaction client 304 and, in some examples, no or limited portions of the small-scale application can be accessed outside of the interaction client 304. The small-scale application can be launched by the interaction client 304 receiving, from a third-party server 310 for example, a markup-language document associated with the small-scale application and processing such a document.

In response to determining that the external resource is a locally-installed application 306, the interaction client 304 instructs the client device 302 to launch the external resource by executing locally-stored code corresponding to the external resource. In response to determining that the external resource is a web-based resource, the interaction client 304 communicates with the third-party servers 310 (for example) to obtain a markup-language document corresponding to the selected external resource. The interaction client 304 then processes the obtained markup-language document to present the web-based external resource within a user interface of the interaction client 304.

The interaction client 304 can notify a user of the client device 302, or other users related to such a user (e.g., "friends"), of activity taking place in one or more external resources. For example, the interaction client 304 can provide participants in a conversation (e.g., a chat session) in the interaction client 304 with notifications relating to the current or recent use of an external resource by one or more members of a group of users. One or more users can be invited to join in an active external resource or to launch a recently-used but currently inactive (in the group of friends) external resource. The external resource can provide participants in a conversation, each using respective interaction clients 304, with the ability to share an item, status, state, or location in an external resource with one or more members of a group of users into a chat session. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the interaction client 304. The external resource can selectively include different media items in the responses, based on a current context of the external resource.

The interaction client 304 can present a list of the available external resources (e.g., applications 306 or applets) to a user to launch or access a given external resource. This list can be presented in a context-sensitive menu. For example, the icons representing different ones of the application 306 (or applets) can vary based on how the menu is launched by the user (e.g., from a conversation interface or from a non-conversation interface).

System Architecture

Figure 4:
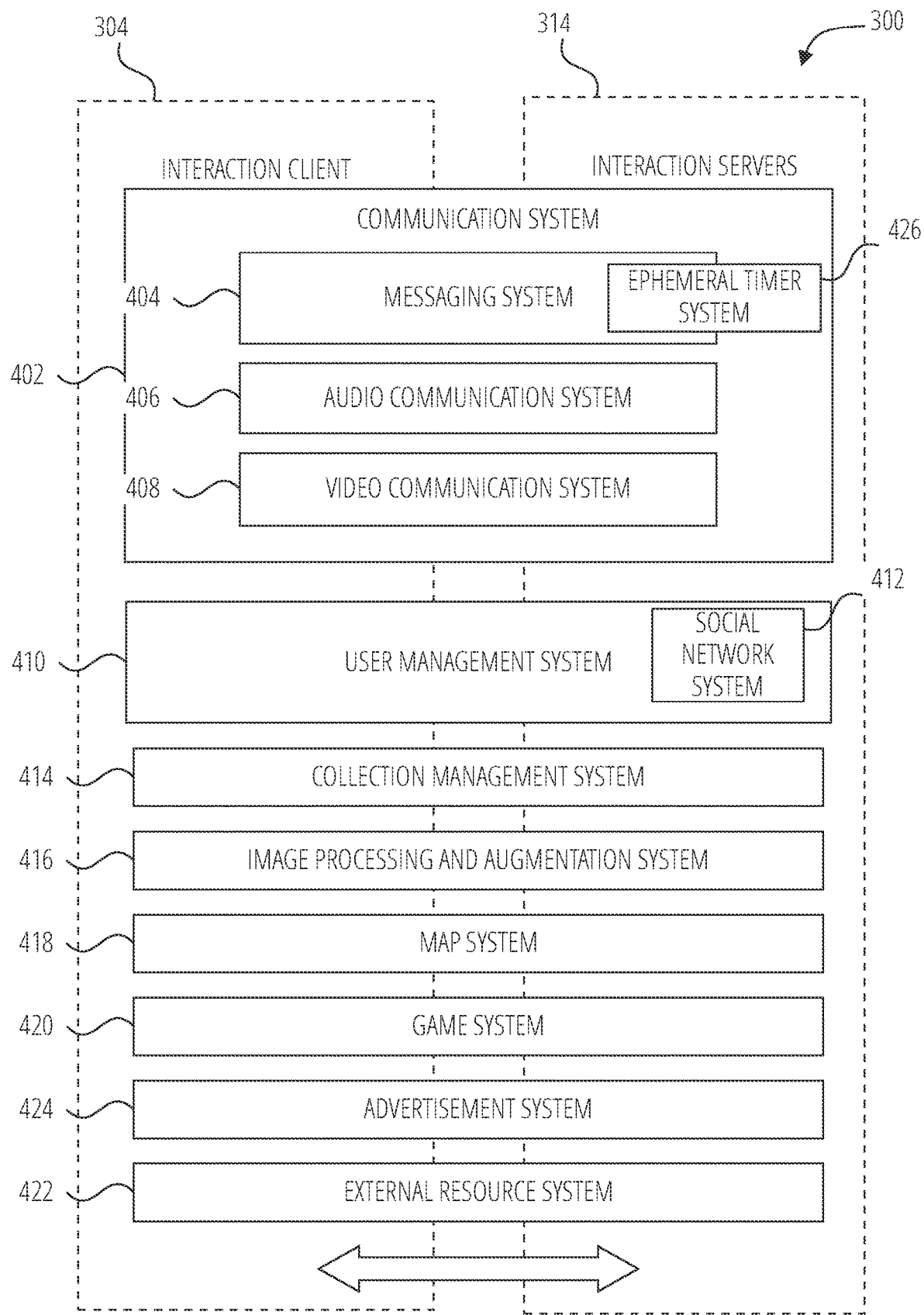
FIG. 4 is a diagrammatic representation of a messaging system, in accordance with some examples, that has both client-side and server-side functionality.

FIG. 4 is a block diagram illustrating further details regarding the interaction system 300, according to some examples. Specifically, the interaction system 300 is shown to comprise the interaction client 304 and the interaction servers 314. The interaction system 300 embodies a number of subsystems, which are supported on the client-side by the interaction client 304 and on the sever-side by the interaction servers 314. Example subsystems are discussed below.

A 302 is responsible for enabling and processing multiple forms of communication and interaction within the interaction system 300, and includes a messaging system 404, an audio communication system 406, and a video communication system 408. The messaging system 404 is responsible for enforcing the temporary or time-limited access to content by the interaction clients 304. The messaging system 404 incorporates a number of timers (e.g., within an ephemeral timer system 426) that, based on duration and display parameters associated with a message, or collection of messages (e.g., a story), selectively enable access (e.g., for presentation and display) to messages and associated content via the interaction client 304. Further details regarding the operation of the ephemeral timer system 426 are provided below. The audio communication system 406 enables and supports audio communications (e.g., real-time audio chat) between multiple interaction clients 304. Similar, the video communication system 408 enables and supports video communications (e.g., real-time video chat) between multiple interaction clients 304.

A user management system 410 is operationally responsible for the management of user data and profiles, and includes a social network system 412 that maintains information regarding relationships between users of the interaction system 300.

A collection management system 414 which is operationally responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 414 may also be responsible for publishing an icon that provides notification of the existence of a particular collection to the user interface of the interaction client 304. The collection management system 414 furthermore includes a curation function that allows a collection manager to manage and curate a particular collection of content. For example, the curation interface enables an event organizer to curate a collection of content relating to a specific event (e.g., delete inappropriate content or redundant messages). Additionally, the collection management system 414 employs machine vision (or image recognition technology) and content rules to automatically curate a content collection. In certain examples, compensation may be paid to a user for the inclusion of user-generated content into a collection. In such cases, the collection management system 414 operates to automatically make payments to such users for the use of their content.

An image processing and augmentation system 416 provides various functions that enable a user to augment (e.g., annotate or otherwise modify or edit) media content associated with a message. For example, the image processing and augmentation system 416 provides functions related to the generation and publishing of media overlays for messages processed by the interaction system 300. The image processing and augmentation system 416 operatively supplies a media overlay or augmentation (e.g., an image filter) to the interaction client 304 based on a geolocation of the client device 302. In another example, the image processing and augmentation system 416 operatively supplies a media overlay to the interaction client 304 based on other information, such as social network information of the user of the client device 302. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at client device 302 for communication in a message, or applied to video content, such as a video content stream or feed transmitted from an interaction client 304. As such, the image processing and augmentation system 416 may interact with, and support, the various subsystems of the communication system 402, such as the messaging system 404 and the video communication system 408. A media overlay may include text or image that can be overlaid on top of a photograph taken by the client device 302, or a video stream produced by the client device 302. In another examples, the media overlay may be a location overlay (e.g., Venice beach), a name of a live event, or a name of a merchant overlay (e.g., Beach Coffee House). In further examples, the image processing and augmentation system 416 uses the geolocation of the client device 302 to identify a media overlay that includes the name of a merchant at the geolocation of the client device 302. The media overlay may include other indicia associated with the merchant. The media overlays may be stored in the databases 320 and accessed through the database server 318.

In some examples, the image processing and augmentation system 416 provides a user-based publication platform that enables users to select a geolocation on a map and upload content associated with the selected geolocation. The user may also specify circumstances under which a particular media overlay should be offered to other users. The image processing and augmentation system 416 generates a media overlay that includes the uploaded content and associates the uploaded content with the selected geolocation.

In other examples, the image processing and augmentation system 416 provides a merchant-based publication platform that enables merchants to select a particular media overlay associated with a geolocation via a bidding process. For example, the image processing and augmentation system 416 associates the media overlay of the highest bidding merchant with a corresponding geolocation for a predefined amount of time.

A map system 418 provides various geographic location functions, and supports the presentation of map-based media content and messages by the interaction client 304. For example, the map system 418 enables the display of user icons or avatars (e.g., stored in profile data 516) on a map to indicate a current or past location of "friends" of a user, as well as media content (e.g., collections of messages including photographs and videos) generated by such friends, within the context of a map. For example, a message posted by a user to the interaction system 300 from a specific geographic location may be displayed within the context of a map at that particular location to "friends" of a specific user on a map interface of the interaction client 304. A user can furthermore share his or her location and status information (e.g., using an appropriate status avatar) with other users of the interaction system 300 via the interaction client 304, with this location and status information being similarly displayed within the context of a map interface of the interaction client 304 to selected users.

A game system 420 provides various gaming functions within the context of the interaction client 304. The interaction client 304 provides a game interface providing a list of available games that can be launched by a user within the context of the interaction client 304, and played with other users of the interaction system 300. The interaction system 300 further enables a particular user to invite other users to participate in the play of a specific game, by issuing invitations to such other users from the interaction client 304. The interaction client 304 also supports audio, video and text messaging (e.g., chats) within the context of gameplay, provides a leaderboard for the games, and also supports the provision of in-game rewards (e.g., coins and items).

An external resource system 422 provides an interface for the interaction client 304 to communicate with remote servers (e.g., third-party servers 310) to launch or access external resources, i.e. applications or applets Each third-party server 310 hosts, for example, a markup language (e.g., HTML5) based application or small-scale version of an application (e.g., game, utility, payment, or ride-sharing application). The interaction client 304 may launches a web-based resource (e.g., application) by accessing the HTML5 file from the third-party servers 310 associated with the web-based resource. In certain examples, applications hosted by third-party servers 310 are programmed in JavaScript leveraging a Software Development Kit (SDK) provided by the interaction servers 314. The SDK includes Application Programming Interfaces (APIs) with functions that can be called or invoked by the web-based application. In certain examples, the interaction servers 314 includes a JavaScript library that provides a given external resource access to certain user data of the interaction client 304. HTML5 is used as an example technology for programming games, but applications and resources programmed based on other technologies can be used.

In order to integrate the functions of the SDK into the web-based resource, the SDK is downloaded by a third-party server 310 from the interaction servers 314 or is otherwise received by the third-party server 310. Once downloaded or received, the SDK is included as part of the application code of a web-based external resource. The code of the web-based resource can then call or invoke certain functions of the SDK to integrate features of the interaction client 304 into the web-based resource.

The SDK stored on the interaction server system 308 effectively provides the bridge between an external resource (e.g., applications 306 or applets and the interaction client 304. This provides the user with a seamless experience of communicating with other users on the interaction client 304, while also preserving the look and feel of the interaction client 304. To bridge communications between an external resource and an interaction client 304, in certain examples, the SDK facilitates communication between third-party servers 310 and the interaction client 304. In certain examples, a WebViewJavaScriptBridge running on a client device 302 establishes two one-way communication channels between an external resource and the interaction client 304. Messages are sent between the external resource and the interaction client 304 via these communication channels asynchronously. Each SDK function invocation is sent as a message and callback. Each SDK function is implemented by constructing a unique callback identifier and sending a message with that callback identifier.

By using the SDK, not all information from the interaction client 304 is shared with third-party servers 310. The SDK limits which information is shared based on the needs of the external resource. In certain examples, each third-party server 310 provides an HTML5 file corresponding to the web-based external resource to interaction servers 314. The interaction servers 314 can add a visual representation (such as a box art or other graphic) of the web-based external resource in the interaction client 304. Once the user selects the visual representation or instructs the interaction client 304 through a GUI of the interaction client 304 to access features of the web-based external resource, the interaction client 304 obtains the HTML5 file and instantiates the resources to access the features of the web-based external resource.

The interaction client 304 presents a graphical user interface (e.g., a landing page or title screen) for an external resource. During, before, or after presenting the landing page or title screen, the interaction client 304 determines whether the launched external resource has been previously authorized to access user data of the interaction client 304. In response to determining that the launched external resource has been previously authorized to access user data of the interaction client 304, the interaction client 304 presents another graphical user interface of the external resource that includes functions and features of the external resource. In response to determining that the launched external resource has not been previously authorized to access user data of the interaction client 304, after a threshold period of time (e.g., 3 seconds) of displaying the landing page or title screen of the external resource, the interaction client 304 slides up (e.g., animates a menu as surfacing from a bottom of the screen to a middle of or other portion of the screen) a menu for authorizing the external resource to access the user data. The menu identifies the type of user data that the external resource will be authorized to use. In response to receiving a user selection of an accept option, the interaction client 304 adds the external resource to a list of authorized external resources and allows the external resource to access user data from the interaction client 304. In some examples, the external resource is authorized by the interaction client 304 to access the user data in accordance with an OAuth 2 framework.

The interaction client 304 controls the type of user data that is shared with external resources based on the type of external resource being authorized. For example, external resources that include full-scale applications (e.g., an application 306) are provided with access to a first type of user data (e.g., two-dimensional avatars of users with or without different avatar characteristics). As another example, external resources that include small-scale versions of applications (e.g., web-based versions of applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

An advertisement system 424 operationally enables the purchasing of advertisements by third parties for presentation to end-users via the interaction clients 304, and also handles the delivery and presentation of these advertisements.

Data Architecture

Figure 5:
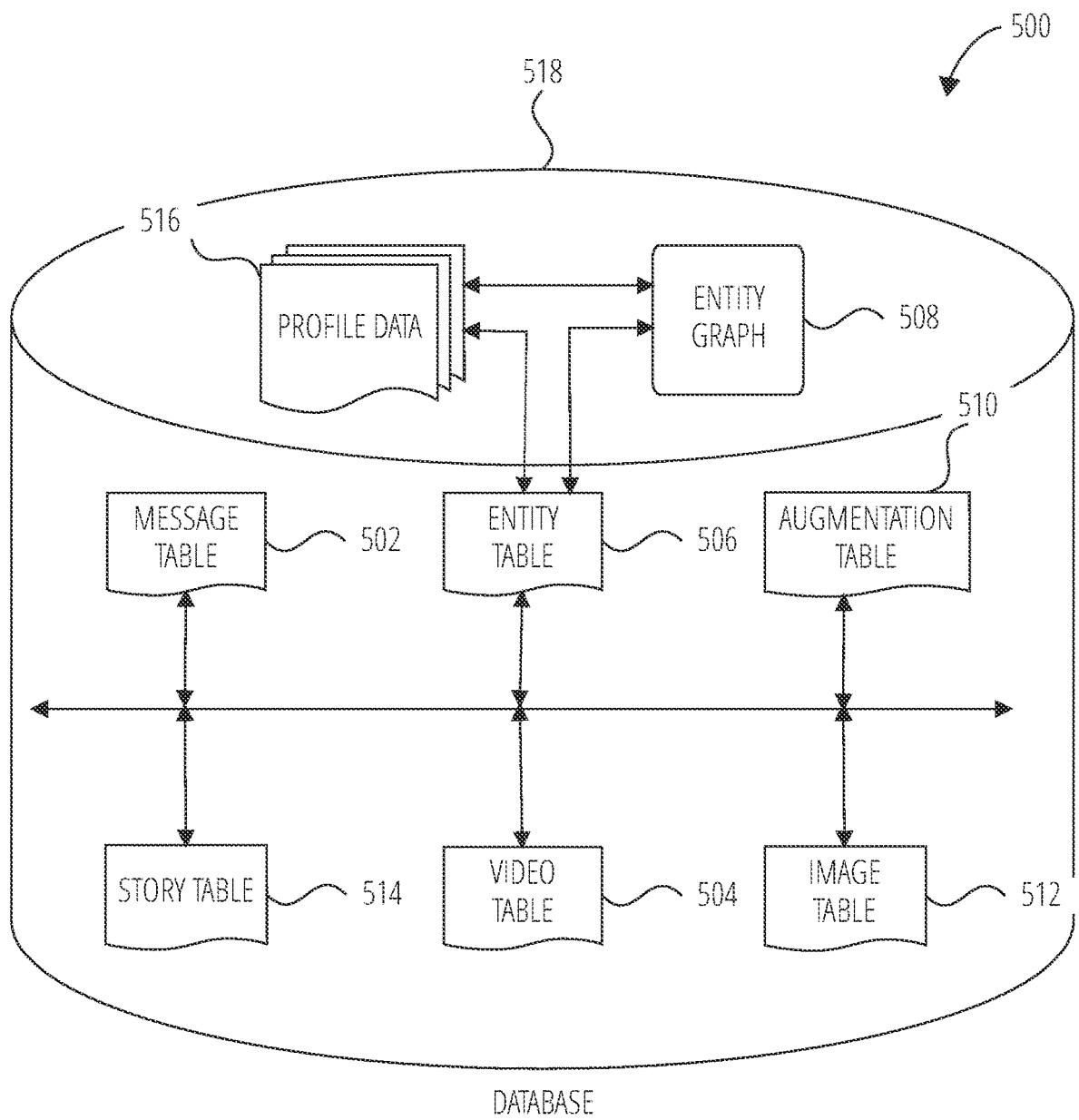
FIG. 5 is a diagrammatic representation of a data structure as maintained in a database, in accordance with some examples.

FIG. 5 is a schematic diagram illustrating data structures 500, which may be stored in the database 518 of the interaction server system 308, according to certain examples. While the content of the database 518 is shown to comprise a number of tables, it will be appreciated that the data could be stored in other types of data structures (e.g., as an object-oriented database).

The database 518 includes message data stored within a message table 502. This message data includes, for any particular one message, at least message sender data, message recipient (or receiver) data, and a payload. Further details regarding information that may be included in a message, and included within the message data stored in the message table 502 is described below with reference to FIG. 5.

An entity table 506 stores entity data, and is linked (e.g., referentially) to an entity graph 508 and profile data 516. Entities for which records are maintained within the entity table 506 may include individuals, corporate entities, organizations, objects, places, events, and so forth. Regardless of entity type, any entity regarding which the interaction server system 308 stores data may be a recognized entity. Each entity is provided with a unique identifier, as well as an entity type identifier (not shown).

The entity graph 508 stores information regarding relationships and associations between entities. Such relationships may be social, professional (e.g., work at a common corporation or organization) interested-based or activity-based, merely for example.

The profile data 516 stores multiple types of profile data about a particular entity. The profile data 516 may be selectively used and presented to other users of the interaction system 300, based on privacy settings specified by a particular entity. Where the entity is an individual, the profile data 516 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the interaction system 300, and on map interfaces displayed by interaction clients 304 to other users. The collection of avatar representations may include "status avatars," which present a graphical representation of a status or activity that the user may select to communicate at a particular time.

Where the entity is a group, the profile data 516 for the group may similarly include one or more avatar representations associated with the group, in addition to the group name, members, and various settings (e.g., notifications) for the relevant group.

The database 518 also stores augmentation data, such as overlays or filters, in an augmentation table 510. The augmentation data is associated with and applied to videos (for which data is stored in a video table 504) and images (for which data is stored in an image table 512).

Filters, in one example, are overlays that are displayed as overlaid on an image or video during presentation to a recipient user. Filters may be of various types, including user-selected filters from a set of filters presented to a sending user by the interaction client 304, when the sending user is composing a message. Other types of filters include geolocation filters (also known as geo-filters), which may be presented to a sending user based on geographic location. For example, geolocation filters specific to a neighborhood or special location may be presented within a user interface by the interaction client 304, based on geolocation information determined by a Global Positioning System (GPS) unit of the client device 302.

Another type of filter is a data filter, which may be selectively presented to a sending user by the interaction client 304, based on other inputs or information gathered by the client device 302 during the message creation process. Examples of data filters include current temperature at a specific location, a current speed at which a sending user is traveling, battery life for a client device 302, or the current time.

Other augmentation data that may be stored within the image table 512 includes augmented reality content items (e.g., corresponding to applying Lenses or augmented reality experiences). An augmented reality content item may be a real-time special effect and sound that may be added to an image or a video.

As described above, augmentation data includes augmented reality content items, overlays, image transformations, AR images, and similar terms refer to modifications that may be applied to image data (e.g., videos or images). This includes real-time modifications, which modify an image as it is captured using device sensors (e.g., one or multiple cameras) of the client device 302 and then displayed on a screen of the client device 302 with the modifications. This also includes modifications to stored content, such as video clips in a gallery that may be modified. For example, in a client device 302 with access to multiple augmented reality content items, a user can use a single video clip with multiple augmented reality content items to see how the different augmented reality content items will modify the stored clip. For example, multiple augmented reality content items that apply different pseudorandom movement models can be applied to the same content by selecting different augmented reality content items for the content. Similarly, real-time video capture may be used with an illustrated modification to show how video images currently being captured by sensors of a client device 302 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudorandom animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various examples, different methods for achieving such transformations may be used. Some examples may involve generating a three-dimensional mesh model of the object or objects, and using transformations and animated textures of the model within the video to achieve the transformation. In other examples, tracking of points on an object may be used to place an image or texture (which may be two dimensional or three dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of object's elements characteristic points for each element of an object are calculated (e.g., using an Active Shape Model (ASM) or other known methods). Then, a mesh based on the characteristic points is generated for each of the at least one element of the object. This mesh used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification properties of the mentioned areas can be transformed in different ways. Such modifications may involve changing color of areas; removing at least some part of areas from the frames of the video stream, including one or more new objects into areas which are based on a request for modification; and modifying or distorting the elements of an area or object. In various examples, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image with use of a specific face detection algorithm (e.g., Viola-Jones). Then, an Active Shape Model (ASM) algorithm is applied to the face region of an image to detect facial feature reference points.

Other methods and algorithms suitable for face detection can be used. For example, in some examples, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some examples, a search for landmarks from the mean shape aligned to the position and size of the face determined by a global face detector is started. Such a search then repeats the steps of suggesting a tentative shape by adjusting the locations of shape points by template matching of the image texture around each point and then conforming the tentative shape to a global shape model until convergence occurs. In some systems, individual template matches are unreliable, and the shape model pools the results of the weak template matches to form a stronger overall classifier. The entire search is repeated at each level in an image pyramid, from coarse to fine resolution.

A transformation system can capture an image or video stream on a client device (e.g., the client device 302) and perform complex image manipulations locally on the client device 302 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 302.

In some examples, a computer animation model to transform image data can be used by a system where a user may capture an image or video stream of the user (e.g., a selfie) using the client device 302 having a neural network operating as part of an interaction client 304 operating on the client device 302. The transformation system operating within the interaction client 304 determines the presence of a face within the image or video stream and provides modification icons associated with a computer animation model to transform image data, or the computer animation model can be present as associated with an interface described herein. The modification icons include changes that may be the basis for modifying the user's face within the image or video stream as part of the modification operation. Once a modification icon is selected, the transform system initiates a process to convert the image of the user to reflect the selected modification icon (e.g., generate a smiling face on the user). A modified image or video stream may be presented in a graphical user interface displayed on the client device 302 as soon as the image or video stream is captured, and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled Machine taught neural networks may be used to enable such modifications.

The graphical user interface, presenting the modification performed by the transform system, may supply the user with additional interaction options. Such options may be based on the interface used to initiate the content capture and selection of a particular computer animation model (e.g., initiation from a content creator user interface). In various examples, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a graphical user interface. In some examples, individual faces, among a group of multiple faces, may be individually modified, or such modifications may be individually toggled by tapping or selecting the individual face or a series of individual faces displayed within the graphical user interface.

A story table 514 stores data regarding collections of messages and associated image, video, or audio data, which are compiled into a collection (e.g., a story or a gallery). The creation of a particular collection may be initiated by a particular user (e.g., each user for which a record is maintained in the entity table 506). A user may create a "personal story" in the form of a collection of content that has been created and sent/broadcast by that user. To this end, the user interface of the interaction client 304 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from varies locations and events. Users whose client devices have location services enabled and are at a common location event at a particular time may, for example, be presented with an option, via a user interface of the interaction client 304, to contribute content to a particular live story. The live story may be identified to the user by the interaction client 304, based on his or her location. The end result is a "live story" told from a community perspective.

A further type of content collection is known as a "location story," which enables a user whose client device 302 is located within a specific geographic location (e.g., on a college or university campus) to contribute to a particular collection. In some examples, a contribution to a location story may require a second degree of authentication to verify that the end user belongs to a specific organization or other entity (e.g., is a student on the university campus).

As mentioned above, the video table 504 stores video data that, in one example, is associated with messages for which records are maintained within the message table 502. Similarly, the image table 512 stores image data associated with messages for which message data is stored in the entity table 506. The entity table 506 may associate various augmentations from the augmentation table 510 with various images and videos stored in the image table 512 and the video table 504.

Methodology

Figure 6:
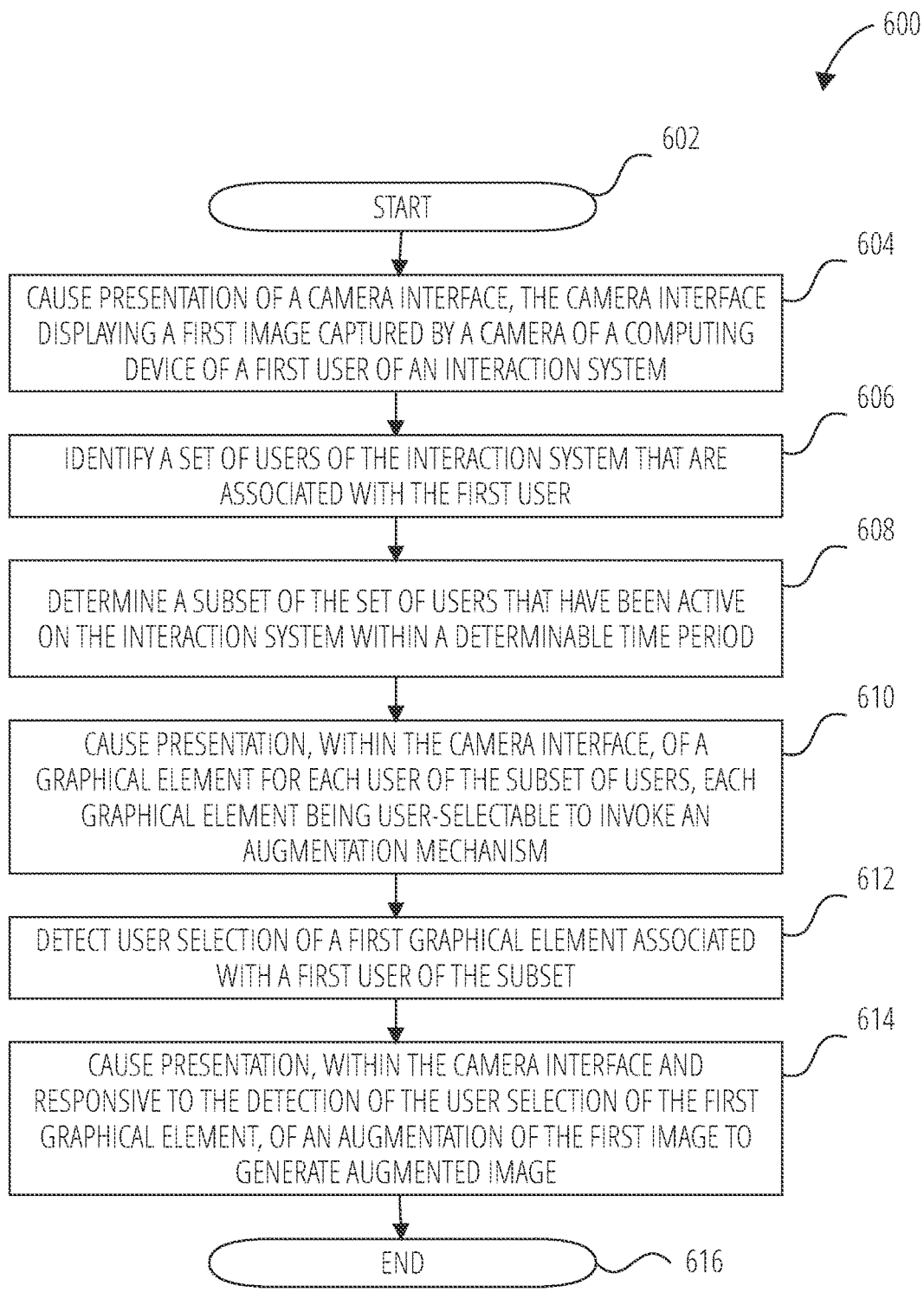
FIG. 6 is a flowchart illustrating a method 600 in accordance with some examples.

FIG. 6 is a flowchart illustrating a method 600, according to some examples, to generate augmented reality (AR) image data (e.g., still or video image data). The operations of the method 600 may be performed within the context of the interaction system 300 by the interaction client 304, the interaction servers 314, or a combination of interaction client 304 and interaction servers 314. The various subsystems of the interaction system 300, described with reference to FIG. 4, are deployed to support these operations.

The method 600 commences at start block 602, and progresses to operation 604. At operation 604, the interaction system 300 causes presentation of a camera interface 102, the camera interface 102 displaying a first image (e.g., image 120) captured by a camera of a computing device (e.g., the client device 302) of a first user (e.g., a viewing user) of an interaction system 300.

At operation 606, the interaction system 300 identifies a set of users of the interaction system 300 that is associated with the first user. The identification may include identifying "friends" of the viewing user by the user management system 410 and the social network system 412, which access the entity table 506, the entity graph 508, and the profile data 516 to identify relationships between users of the interaction system 300.

At operation 608, the interaction system 300 determines a subset of the set of users that have been active on the interaction system 300 within a determinable time period (e.g., within the last hour, six hours, 24 hours, or week). Specifically, activities by users within the interaction system 300 may be logged within the profile data 516, with each activity record indicating activity type and a timestamp reflecting the date and time of the relevant activity. By referencing this activity data, for the set of users, the interaction system 300 is able to determine a subset of users that have been active within the determinable time period.

As noted above, this is set of user data is stored as a ranked list, and is updated (e.g., reordered, added to, or subtracted from) based on logged activity by users associated with the viewing user. For example, where a user is inactive for a certain amount of time (e.g., 30 minutes), they may be removed from the subset of users for which avatar icons 106 are displayed within the carousel 104.

At operation 610, the interaction system 300 causes presentation, within the camera interface 102, of a graphical element for each user of the subset of users. For example, graphical elements in the form of the avatar icons 106 may be presented within the filter carousel 104. Each of these avatar icons 106 is user-selectable (e.g., by a user gesture and/or by rotation of the filter carousel 104) to invoke an augmentation mechanism (e.g., a filter or overlay mechanism) that presents an augmentation 108 within the context of the camera interface 102.

At operation 612, the interaction system 300 detects user selection of a first graphical element (e.g., a customized icon in the form of an avatar icon 106) associated with a first user (e.g., "Jane") of the subset. Again, this selection may be performed in a number of ways such as by a user action or gesture on a touchscreen of a client device 302 on which the interaction client 304 is executing. Examples include a tap on the relevant avatar icon 106, or a rotation of the carousel 104 to move the relevant avatar icon 106 into an activation position.

At operation 614, the interaction system 300 causes presentation, within the camera interface 102 and responsive to the detection of the user selection of the first graphical element, of an augmentation (e.g., a further image such as the augmentation 108) of the first image to generate a composite augmented image. The augmentation 108 may be overlaid on the first image (e.g., a real-time image 120) to generate the composite image. Further, as described above with reference to screenshot 118, the interaction system 300 may cause the presentation of a message portion to receive text input (e.g., textual information 110) for a message to be communicated by the communication system 402 from the interaction client 304. The text input and the composite, augmented image may be included as part of such a message that is sent from the interaction client 304, via the interaction servers 314.

The method 600 then terminates at done block 616. While the operations of the method 600 are shown in FIG. 6 as being sequential, it will be appreciated that the interaction system 300 may continuously monitor activities of "friend" users of a viewing user on the interaction system 300 at operation 608, in order to update the subset of users that are active on the interaction system 300 within a determinable time period.

Data Communications Architecture

Figure 7:
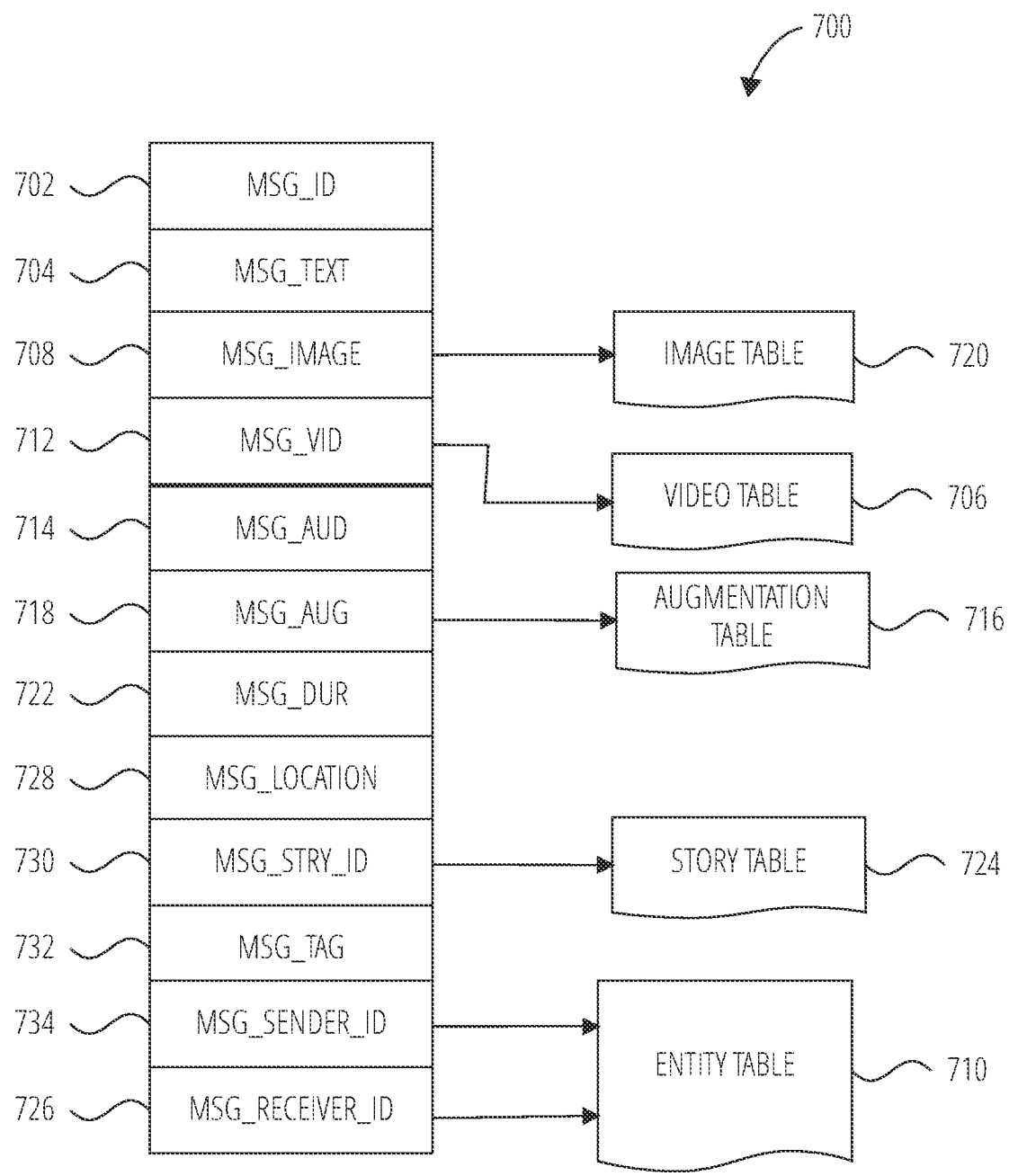
FIG. 7 is a diagrammatic representation of a message, in accordance with some examples.

FIG. 7 is a schematic diagram illustrating a structure of a message 700, according to some examples, generated by an interaction client 304 for communication to a further interaction client 304 via the interaction servers 314. The content of a particular message 700 is used to populate the message table 502 stored within the database 320, accessible by the interaction servers 314. Similarly, the content of a message 700 is stored in memory as "in-transit" or "in-flight" data of the client device 302 or the interaction servers 314. A message 700 is shown to include the following example components:

- message identifier 702: a unique identifier that identifies the message 700.
- message text payload 704: text, to be generated by a user via a user interface of the client device 302, and that is included in the message 700.
- message image payload 708: image data, captured by a camera component of a client device 302 or retrieved from a memory component of a client device 302, and that is included in the message 700. Image data for a sent or received message 700 may be stored in the image table 720.
- message video payload 712: video data, captured by a camera component or retrieved from a memory component of the client device 302, and that is included in the message 700. Video data for a sent or received message 700 may be stored in the video table 706.
- message audio payload 714: audio data, captured by a microphone or retrieved from a memory component of the client device 302 and that is included in the message 700.
- message augmentation data 718: augmentation data (e.g., filters, stickers, or other annotations or enhancements) that represents augmentations to be applied to message image payload 708, message video payload 712, or message audio payload 714 of the message 700. Augmentation data for a sent or received message 700 may be stored in the augmentation table 716.
- message duration parameter 722: parameter value indicating, in seconds, the amount of time for which content of the message (e.g., the message image payload 708, message video payload 712, message audio payload 714) is to be presented or made accessible to a user via the interaction client 304.
- message geolocation parameter 728: geolocation data (e.g., latitudinal and longitudinal coordinates) associated with the content payload of the message. Multiple message geolocation parameter 728 values may be included in the payload, each of these parameter values being associated with respect to content items included in the content (e.g., a specific image into within the message image payload 708, or a specific video in the message video payload 712).
- message story identifier 730: identifier values identifying one or more content collections (e.g., "stories" identified in the story table 724) with which a particular content item in the message image payload 708 of the message 700 is associated. For example, multiple images within the message image payload 708 may each be associated with multiple content collections using identifier values.
- message tag 732: each message 700 may be tagged with multiple tags, each of which is indicative of the subject matter of content included in the message payload. For example, where a particular image included in the message image payload 708 depicts an animal (e.g., a lion), a tag value may be included within the message tag 732 that is indicative of the relevant animal. Tag values may be generated manually, based on user input, or may be automatically generated using, for example, image recognition.
- message sender identifier 734: an identifier (e.g., a messaging system identifier, email address, or device identifier) indicative of a user of the Client device 302 on which the message 700 was generated and from which the message 700 was sent.
- message receiver identifier 726: an identifier (e.g., a messaging system identifier, email address, or device identifier) indicative of a user of the client device 302 to which the message 700 is addressed.

The contents (e.g., values) of the various components of message 700 may be pointers to locations in tables within which content data values are stored. For example, an image value in the message image payload 708 may be a pointer to (or address of) a location within an image table 720. Similarly, values within the message video payload 712 may point to data stored within a video table 706, values stored within the message augmentations 412 may point to data stored in an augmentation table 716, values stored within the message story identifier 730 may point to data stored in a story table 724, and values stored within the message sender identifier 734 and the message receiver identifier 726 may point to user records stored within an entity table 710.

Time-Based Access Limitation Architecture

Figure 8:
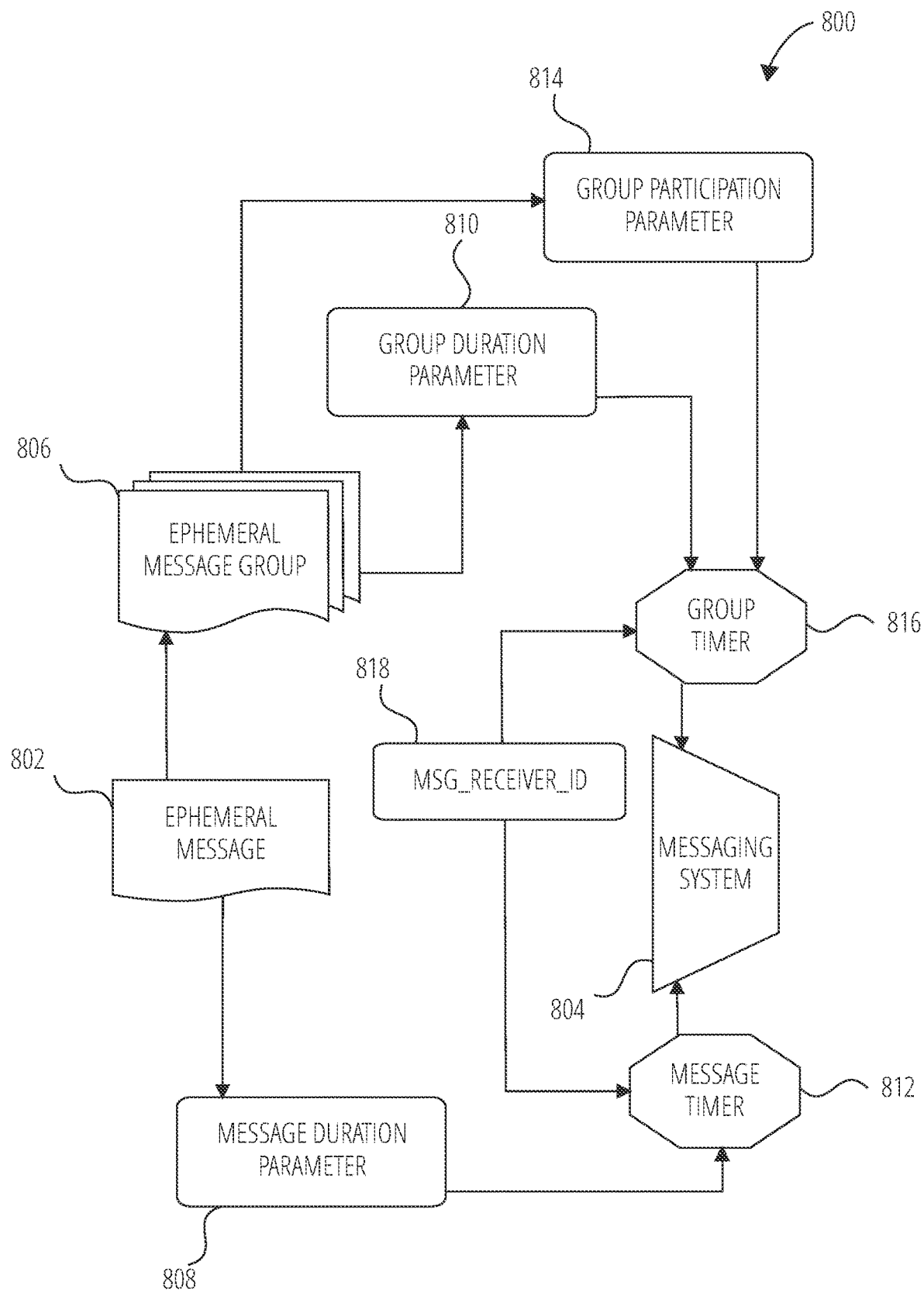
FIG. 8 is a flowchart for an access-limiting process, in accordance with some examples.

FIG. 8 is a schematic diagram illustrating an access-limiting process 800, in terms of which access to content (e.g., an ephemeral message 802, and associated multimedia payload of data) or a content collection (e.g., an ephemeral message group 806) may be time-limited (e.g., made ephemeral).

An ephemeral message 802 is shown to be associated with a message duration parameter 808, the value of which determines an amount of time that the ephemeral message 802 will be displayed to a receiving user of the ephemeral message 802 by the interaction client 304. In one example, an ephemeral message 802 is viewable by a receiving user for up to a maximum of 10 seconds, depending on the amount of time that the sending user specifies using the message duration parameter 808.

The message duration parameter 808 and the message receiver identifier 818 are shown to be inputs to a message timer 812, which is responsible for determining the amount of time that the ephemeral message 802 is shown to a particular receiving user identified by the message receiver identifier 818. In particular, the ephemeral message 802 will be shown to the relevant receiving user for a time period determined by the value of the message duration parameter 808. The message timer 812 is shown to provide output to a more generalized messaging system 804, which is responsible for the overall timing of display of content (e.g., an ephemeral message 802) to a receiving user.

The ephemeral message 802 is shown in FIG. 8 to be included within an ephemeral message group 806 (e.g., a collection of messages in a personal story, or an event story). The ephemeral message group 806 has an associated group duration parameter 810, a value of which determines a time duration for which the ephemeral message group 806 is presented and accessible to users of the interaction system 300. The group duration parameter 810, for example, may be the duration of a music concert, where the ephemeral message group 806 is a collection of content pertaining to that concert. Alternatively, a user (either the owning user or a curator user) may specify the value for the group duration parameter 810 when performing the setup and creation of the ephemeral message group 806.

Additionally, each ephemeral message 802 within the ephemeral message group 806 has an associated group participation parameter 814, a value of which determines the duration of time for which the ephemeral message 802 will be accessible within the context of the ephemeral message group 806. Accordingly, a particular ephemeral message group 806 may "expire" and become inaccessible within the context of the ephemeral message group 806, prior to the ephemeral message group 806 itself expiring in terms of the group duration parameter 810. The group duration parameter 810, group participation parameter 814, and message receiver identifier 818 each provide input to a group timer 816, which operationally determines, firstly, whether a particular ephemeral message 802 of the ephemeral message group 806 will be displayed to a particular receiving user and, if so, for how long. Note that the ephemeral message group 806 is also aware of the identity of the particular receiving user as a result of the message receiver identifier 818.

Accordingly, the group timer 816 operationally controls the overall lifespan of an associated ephemeral message group 806, as well as an individual ephemeral message 802 included in the ephemeral message group 806. In one example, each and every ephemeral message 802 within the ephemeral message group 806 remains viewable and accessible for a time period specified by the group duration parameter 810. In a further example, a certain ephemeral message 802 may expire, within the context of ephemeral message group 806, based on a group participation parameter 814. Note that a message duration parameter 808 may still determine the duration of time for which a particular ephemeral message 802 is displayed to a receiving user, even within the context of the ephemeral message group 806. Accordingly, the message duration parameter 808 determines the duration of time that a particular ephemeral message 802 is displayed to a receiving user, regardless of whether the receiving user is viewing that ephemeral message 802 inside or outside the context of an ephemeral message group 806.

The messaging system 804 may furthermore operationally remove a particular ephemeral message 802 from the ephemeral message group 806 based on a determination that it has exceeded an associated group participation parameter 814. For example, when a sending user has established a group participation parameter 814 of 24 hours from posting, the messaging system 804 will remove the relevant ephemeral message 802 from the ephemeral message group 806 after the specified 24 hours. The messaging system 804 also operates to remove an ephemeral message group 806 when either the group participation parameter 814 for each and every ephemeral message 802 within the ephemeral message group 806 has expired, or when the ephemeral message group 806 itself has expired in terms of the group duration parameter 810.

In certain use cases, a creator of a particular ephemeral message group 806 may specify an indefinite group duration parameter 810. In this case, the expiration of the group participation parameter 814 for the last remaining ephemeral message 802 within the ephemeral message group 806 will determine when the ephemeral message group 806 itself expires. In this case, a new ephemeral message 802, added to the ephemeral message group 806, with a new group participation parameter 814, effectively extends the life of an ephemeral message group 806 to equal the value of the group participation parameter 814.

Responsive to the messaging system 804 determining that an ephemeral message group 806 has expired (e.g., is no longer accessible), the messaging system 804 communicates with the interaction system 300 (and, for example, specifically the interaction client 304) to cause an indicium (e.g., an icon) associated with the relevant ephemeral message group 806 to no longer be displayed within a user interface of the interaction client 304. Similarly, when the messaging system 804 determines that the message duration parameter 808 for a particular ephemeral message 802 has expired, the messaging system 804 causes the interaction client 304 to no longer display an indicium (e.g., an icon or textual identification) associated with the ephemeral message 802.

Machine Architecture

Figure 9:
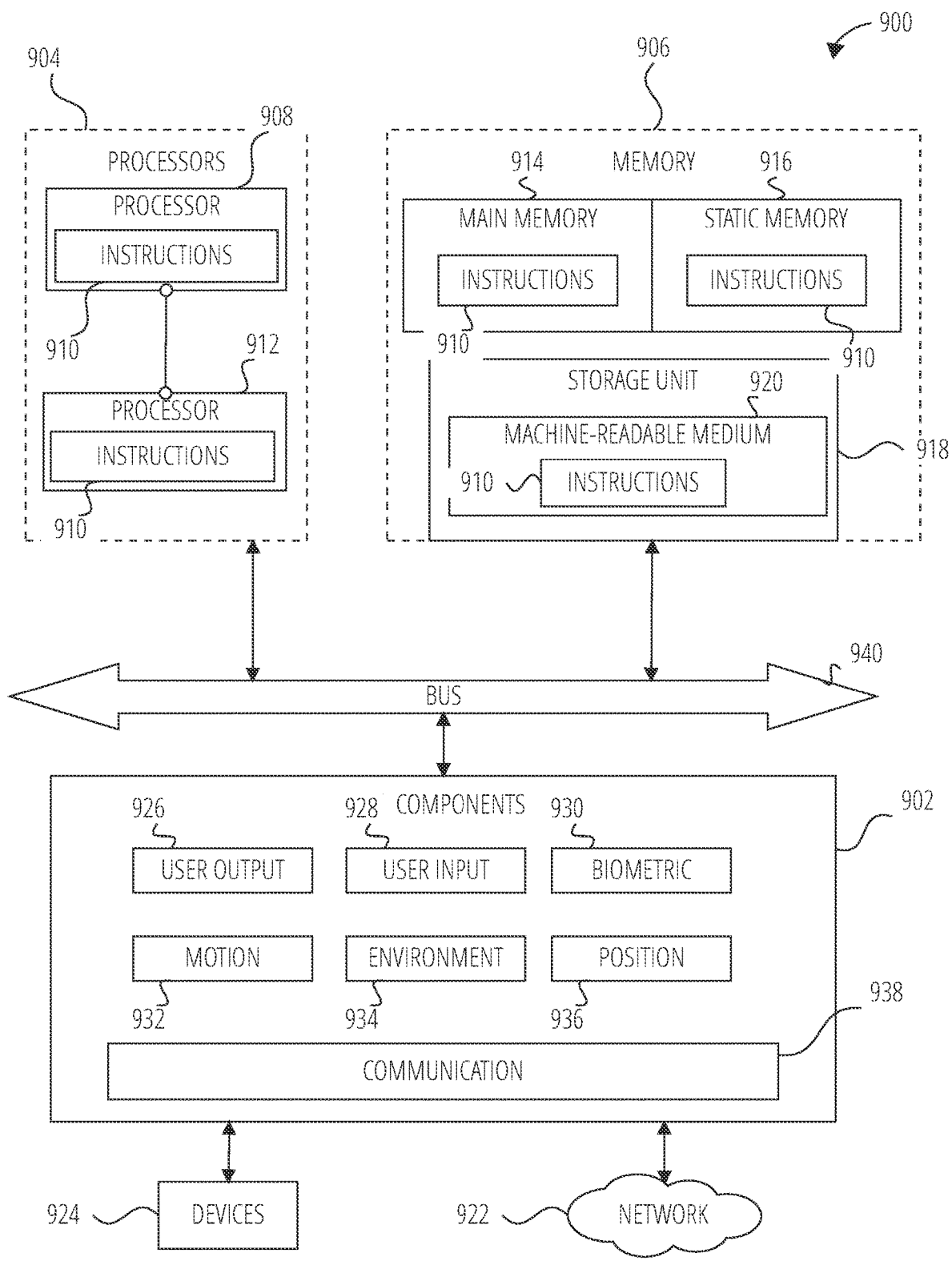
FIG. 9 is a diagrammatic representation of a machine in the form of a computer system within which a set of instructions may be executed for causing the machine to perform any one or more of the methodologies discussed herein, in accordance with some examples.

FIG. 9 is a diagrammatic representation of the machine 900 within which instructions 910 (e.g., software, a program, an application, an applet, an app, or other executable code) for causing the machine 900 to perform any one or more of the methodologies discussed herein may be executed. For example, the instructions 910 may cause the machine 900 to execute any one or more of the methods described herein. The instructions 910 transform the general, non-programmed machine 900 into a particular machine 900 programmed to carry out the described and illustrated functions in the manner described. The machine 900 may operate as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 910, sequentially or otherwise, that specify actions to be taken by the machine 900. Further, while a single machine 900 is illustrated, the term "machine" shall also be taken to include a collection of machines that individually or jointly execute the instructions 910 to perform any one or more of the methodologies discussed herein. The machine 900, for example, may comprise the client device 302 or any one of a number of server devices forming part of the interaction server system 308. In some examples, the machine 900 may also comprise both client and server systems, with certain operations of a particular method or algorithm being performed on the server-side and with certain operations of the particular method or algorithm being performed on the client-side.

The machine 900 may include processors 904, memory 906, and input/output I/O components 902, which may be configured to communicate with each other via a bus 940. In an example, the processors 904 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 908 and a processor 912 that execute the instructions 910. The term "processor" is intended to include multi-core processors that may comprise two or more independent processors (some-times referred to as "cores") that may execute instructions contemporaneously. Although FIG. 9 shows multiple processors 904, the machine 900 may include a single processor with a single-core, a single processor with multiple cores (e.g., a multi-core processor), multiple processors with a single core, multiple processors with multiples cores, or any combination thereof.

The memory 906 includes a main memory 914, a static memory 916, and a storage unit 918, both accessible to the processors 904 via the bus 940. The main memory 906, the static memory 916, and storage unit 918 store the instructions 910 embodying any one or more of the methodologies or functions described herein. The instructions 910 may also reside, completely or partially, within the main memory 914, within the static memory 916, within machine-readable medium 920 within the storage unit 918, within at least one of the processors 904 (e.g., within the Processor's cache memory), or any suitable combination thereof, during execution thereof by the machine 900.

The I/O components 902 may include a wide variety of components to receive input, provide output, produce output, transmit information, exchange information, capture measurements, and so on. The specific I/O components 902 that are included in a particular machine will depend on the type of machine. For example, portable machines such as mobile phones may include a touch input device or other such input mechanisms, while a headless server machine will likely not include such a touch input device. It will be appreciated that the I/O components 902 may include many other components that are not shown in FIG. 9. In various examples, the I/O components 902 may include user output components 926 and user input components 928. The user output components 926 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 928 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 902 may include biometric components 930, motion components 932, environmental components 934, or position components 936, among a wide array of other components. For example, the biometric components 930 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 932 include acceleration sensor components (e.g., accelerometer), gravitation sensor components, rotation sensor components (e.g., gyroscope).

The environmental components 934 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 302 may have a camera system comprising, for example, front cameras on a front surface of the client device 302 and rear cameras on a rear surface of the client device 302. The front cameras may, for example, be used to capture still images and video of a user of the client device 302 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 302 may also include a 360° camera for capturing 360° photographs and videos.

Further, the camera system of the client device 302 may include dual rear cameras (e.g., a primary camera as well as a depth-sensing camera), or even triple, quad or penta rear camera configurations on the front and rear sides of the client device 302. These multiple cameras systems may include a wide camera, an ultra-wide camera, a telephoto camera, a macro camera and a depth sensor, for example.

The position components 936 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 902 further include communication components 938 operable to couple the machine 900 to a network 922 or devices 924 via respective coupling or connections. For example, the communication components 938 may include a network interface Component or another suitable device to interface with the network 922. In further examples, the communication components 938 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 924 may be another machine or any of a wide variety of peripheral devices (e.g., a peripheral device coupled via a USB).

Moreover, the communication components 938 may detect identifiers or include components operable to detect identifiers. For example, the communication components 938 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 938, such as location via Internet Protocol (IP) geolocation, location via Wi-Fi® signal triangulation, location via detecting an NFC beacon signal that may indicate a particular location, and so forth.

The various memories (e.g., main memory 914, static memory 916, and memory of the processors 904) and storage unit 918 may store one or more sets of instructions and data structures (e.g., software) embodying or used by any one or more of the methodologies or functions described herein. These instructions (e.g., the instructions 910), when executed by processors 904, cause various operations to implement the disclosed examples.

The instructions 910 may be transmitted or received over the network 922, using a transmission medium, via a network interface device (e.g., a network interface component included in the communication components 938) and using any one of several well-known transfer protocols (e.g., hypertext transfer protocol (HTTP)). Similarly, the instructions 910 may be transmitted or received using a transmission medium via a coupling (e.g., a peer-to-peer coupling) to the devices 924.

Software Architecture

Figure 10:
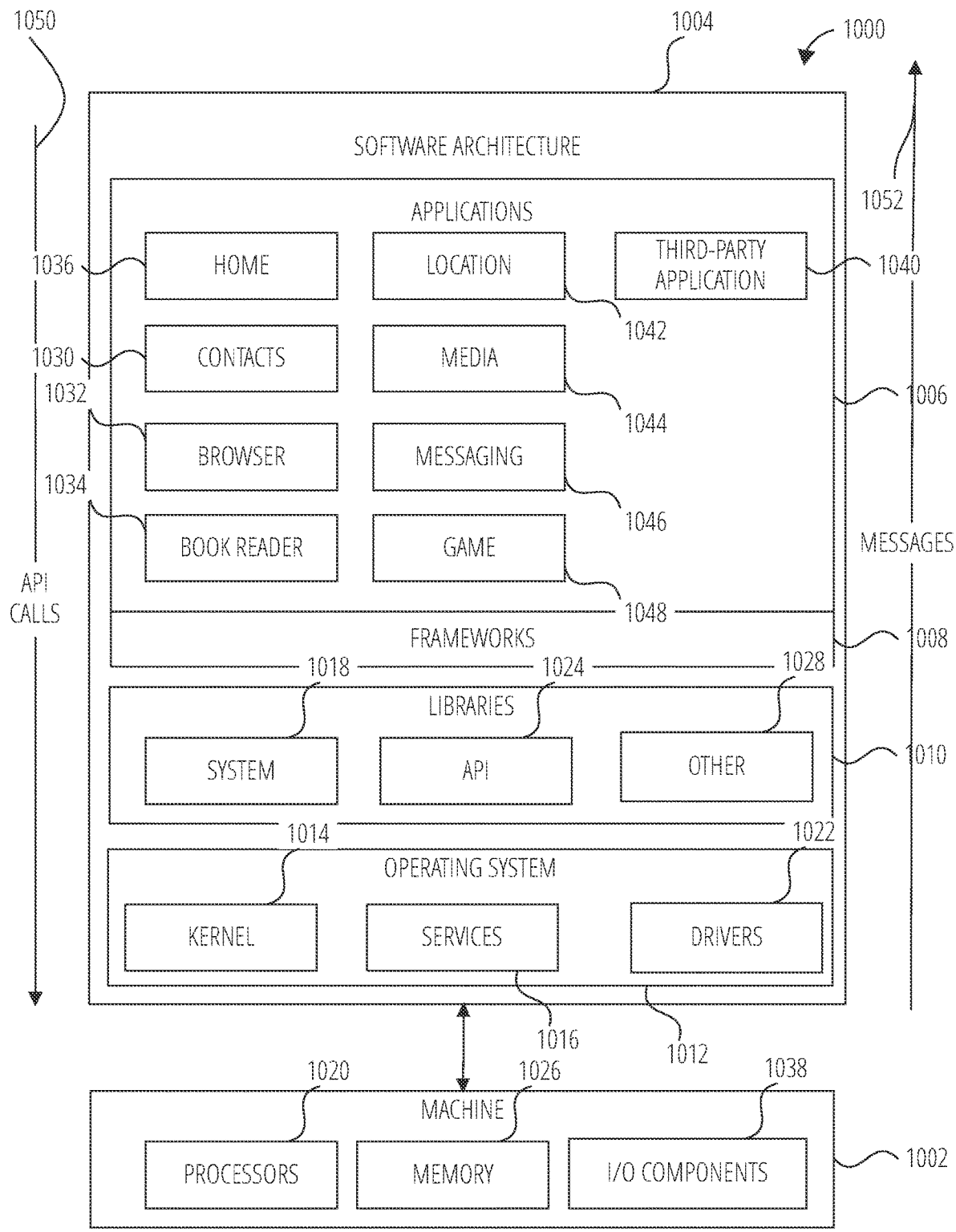
FIG. 10 is a block diagram showing a software architecture within which examples may be implemented.

FIG. 10 is a block diagram 1000 illustrating a software architecture 1004, which can be installed on any one or more of the devices described herein. The software architecture 1004 is supported by hardware such as a machine 1002 that includes processors 1020, memory 1026, and I/O components 1038. In this example, the software architecture 1004 can be conceptualized as a stack of layers, where each layer provides a particular functionality. The software architecture 1004 includes layers such as an operating system 1012, libraries 1010, frameworks 1008, and applications 1006. Operationally, the applications 1006 invoke API calls 1050 through the software stack and receive messages 1052 in response to the API calls 1050.

The operating system 1012 manages hardware resources and provides common services. The operating system 1012 includes, for example, a kernel 1014, services 1016, and drivers 1022. The kernel 1014 acts as an abstraction layer between the hardware and the other software layers. For example, the kernel 1014 provides memory management, processor management (e.g., scheduling), component management, networking, and security settings, among other functionality. The services 1016 can provide other common services for the other software layers. The drivers 1022 are responsible for controlling or interfacing with the underlying hardware. For instance, the drivers 1022 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1010 provide a common low-level infrastructure used by the applications 1006. The libraries 1010 can include system libraries 1018 (e.g., C standard library) that provide functions such as memory allocation functions, string manipulation functions, mathematic functions, and the like. In addition, the libraries 1010 can include API libraries 1024 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1010 can also include a wide variety of other libraries 1028 to provide many other APIs to the applications 1006.

The frameworks 1008 provide a common high-level infrastructure that is used by the applications 1006. For example, the frameworks 1008 provide various graphical user interface (GUI) functions, high-level resource management, and high-level location services. The frameworks 1008 can provide a broad spectrum of other APIs that can be used by the applications 1006, some of which may be specific to a particular operating system or platform.

In an example, the applications 1006 may include a home application 1036, a contacts application 1030, a browser application 1032, a book reader application 1034, a location application 1042, a media application 1044, a messaging application 1046, a game application 1048, and a broad assortment of other applications such as a third-party application 1040. The applications 1006 are programs that execute functions defined in the programs. Various programming languages can be employed to create one or more of the applications 1006, structured in a variety of manners, such as object-oriented programming languages (e.g., Objective-C, Java, or C++) or procedural programming languages (e.g., C or assembly language). In a specific example, the third-party application 1040 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1040 can invoke the API calls 1050 provided by the operating system 1012 to facilitate functionality described herein.

Conclusion

In some examples, a method includes causing presentation of a camera interface, the camera interface displaying a first image captured by a camera of a computing device of a first user of an interaction system, identifying a set of users of the interaction system that are associated with the first user, determining a subset of the set of users that have been active on the interaction system within a determinable time period, causing presentation, within the camera interface, of a graphical element for each user of the subset of users, each graphical element being user-selectable to invoke an augmentation mechanism, detecting user selection of a first graphical element associated with a first user of the subset, and causing presentation, within the camera interface and responsive to the detection of the user selection of the first graphical element, of an augmentation of the first image to generate augmented image.

The method may also include where the first graphical element associated with the first user is a customized icon associated with the first user.

The method may also include where the augmentation includes a second image, and the causing of the presentation includes combining the first image and the second image to create the augmented image.

The method may also include including causing presentation, within the camera interface, of a message portion to receive text input for a message communicated from the computing device of the first user. Other technical features may be readily apparent to one skilled in the art from the following figures, descriptions, and claims.

In one aspect, a computing apparatus includes a processor. The computing apparatus also includes a memory storing instructions that, when executed by the processor, configure the apparatus to cause presentation of a camera interface, the camera interface displaying a first image captured by a camera of a computing device of a first user of an interaction system, identify a set of users of the interaction system that are associated with the first user, determine a subset of the set of users that have been active on the interaction system within a determinable time period, cause presentation, within the camera interface, of a graphical element for each user of the subset of users, each graphical element being user-selectable to invoke an augmentation mechanism, detect user selection of a first graphical element associated with a first user of the subset, and cause presentation, within the camera interface and responsive to the detection of the user selection of the first graphical element, of an augmentation of the first image to generate augmented image.

The first graphical element associated with the first user may be a customized icon associated with the first user. The augmentation may include a second image, and the causing of the presentation includes combine the first image and the second image to create the augmented image.

The computing apparatus may also cause presentation, within the camera interface, of a message portion to receive text input for a message communicated from the computing device of the first user. Other technical features may be readily apparent to one skilled in the art from the following figures, descriptions, and claims.

In one aspect, a non-transitory computer-readable storage medium, the computer-readable storage medium including instructions that when executed by a computer, cause the computer to cause presentation of a camera interface, the camera interface displaying a first image captured by a camera of a computing device of a first user of an interaction system, identify a set of users of the interaction system that are associated with the first user, determine a subset of the set of users that have been active on the interaction system within a determinable time period, cause presentation, within the camera interface, of a graphical element for each user of the subset of users, each graphical element being user-selectable to invoke an augmentation mechanism, detect user selection of a first graphical element associated with a first user of the subset, and cause presentation, within the camera interface and responsive to the detection of the user selection of the first graphical element, of an augmentation of the first image to generate augmented image.

The computer-readable storage medium may also include where the first graphical element associated with the first user is a customized icon associated with the first user.

The computer-readable storage medium may also include where the augmentation includes a second image, and the causing of the presentation includes combine the first image and the second image to create the augmented image.

The computer-readable storage medium may cause presentation, within the camera interface, of a message portion to receive text input for a message communicated from the computing device of the first user. Other technical features may be readily apparent to one skilled in the art from the following figures, descriptions, and claims.

The method may also include where the customers icon is an avatar representation of the first user.

The method may also include where the combining of the first image and the second image includes overlaying the second image on the first image within the camera interface.

The method may also include includes generating a message to include the text input and the augmented image.

The computing apparatus may also include where the customers icon is an avatar representation of the first user.

The computing apparatus may also include where the combining of the first image and the second image includes overlay the second image on the first image within the camera interface.

The computing apparatus may also include includes generate a message to include the text input and the augmented image.

The computer-readable storage medium may also include where the customers icon is an avatar representation of the first user.

The computer-readable storage medium may also include where the combining of the first image and the second image includes overlay the second image on the first image within the camera interface.

The computer-readable storage medium may also include includes generate a message to include the text input and the augmented image. Other technical features may be readily apparent to one skilled in the art from the following figures, descriptions, and claims.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE)

standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 1004 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A method comprising:
    causing presentation of a camera interface, the camera interface displaying a first image captured by a camera of a computing device of a first user of an interaction system;
    identifying a set of users of the interaction system that are associated with the first user;
    determining a subset of the set of users that have been active on the interaction system within a determinable time period;
    causing presentation, within the camera interface, of a rotatable carousel interface which includes a graphical element for each user of the subset of users, each graphical element being user-selectable to invoke an augmentation mechanism, the rotatable carousel interface being configured to receive a swipe gesture for rotating through the graphical elements;
    detecting user selection of a first graphical element associated with a second user of the subset; and
    causing presentation, within the camera interface and responsive to the detection of the user selection of the first graphical element, of an augmentation of the first image to generate an augmented image
    wherein the augmentation comprises one or more second images of an avatar representation of the second user, and a third image comprising a clock indicating a time of a most recent activity by the second user, and
    wherein causing presentation of the augmentation comprises combining the first image, the second image and the third image to create the augmented image, such that the first image, the second image and the third image are simultaneously displayed in response to the detection of the user selection of the first graphical element.

2. The method of claim 1, wherein the combining of the first image and the second image comprises overlaying the second image on the first image within the camera interface.

3. The method of claim 1, including causing presentation, within the camera interface, of a message portion to receive text input for a message communicated from the computing device of the first user.

4. The method of claim 3, comprising generating the message to include the text input and the augmented image.

5. The method of claim 1, further comprising:
    providing, within the camera interface and responsive to the detection of the user selection of the first graphical element, for differentiated display of the first graphical element relative to remaining ones of the graphical elements, to indicate activation of the augmentation mechanism corresponding to the first graphical element.

6. The method of claim 1, wherein the first graphical element is displayed at a horizontally-centered position, and
    wherein the first graphical element includes the avatar representation of the second user.

7. The method of claim 1, wherein the augmentation comprises a fourth image which is displayed in in response to the detection of the user selection of the first graphical element, the fourth image prompting the first user to compose a message for sending to the second user.

8. A computing apparatus comprising:
    a processor; and
    a memory storing instructions that, when executed by the processor, configure the apparatus to:
    cause presentation of a camera interface, the camera interface displaying a first image captured by a camera of a computing device of a first user of an interaction system;
    identify a set of users of the interaction system that are associated with the first user;
    determine a subset of the set of users that have been active on the interaction system within a determinable time period;
    cause presentation, within the camera interface, of a rotatable carousel interface which includes a graphical element for each user of the subset of users, each graphical element being user-selectable to invoke an augmentation mechanism, the rotatable carousel interface being configured to receive a swipe gesture for rotating through the graphical elements;
    detect user selection of a first graphical element associated with a second user of the subset; and
    cause presentation, within the camera interface and responsive to the detection of the user selection of the first graphical element, of an augmentation of the first image to generate an augmented image
    wherein the augmentation comprises one or more second images of an avatar representation of the second user, and a third image comprising a clock indicating a time of a most recent activity by the second user, and
    wherein causing presentation of the augmentation comprises combining the first image, the second image and the third image to create the augmented image, such that the first image, the second image and the third image are simultaneously displayed in response to the detection of the user selection of the first graphical element.

9. The computing apparatus of claim 8, wherein the combining of the first image and the second image comprises overlaying the second image on the first image within the camera interface.

10. The computing apparatus of claim 8, wherein the instructions, when executed by the processor, configure the apparatus to causing presentation, within the camera interface, of a message portion to receive text input for a message communicated from the computing device of the first user.

11. The computing apparatus of claim 10, wherein the instructions, when executed by the processor, configure the apparatus generate the message to include the text input and the augmented image.

12. A non-transitory computer-readable storage medium, the computer-readable storage medium including instructions that when executed by a computer, cause the computer to:
cause presentation of a camera interface, the camera interface displaying a first image captured by a camera of a computing device of a first user of an interaction system;
identify a set of users of the interaction system that are associated with the first user;
determine a subset of the set of users that have been active on the interaction system within a determinable time period;
cause presentation, within the camera interface, of a rotatable carousel interface which includes a graphical element for each user of the subset of users, each graphical element being user-selectable to invoke an augmentation mechanism, the rotatable carousel interface being configured to receive a swipe gesture for rotating through the graphical elements;
detect user selection by the first user of a first graphical element associated with a second user of the subset; and
cause presentation, within the camera interface and responsive to the detection of the user selection of the first graphical element, of an augmentation of the first image to generate an augmented image
wherein the augmentation comprises one or more second images of an avatar representation of the second user, and a third image comprising a clock indicating a time of a most recent activity by the second user, and
wherein causing presentation of the augmentation comprises combining the first image, the second image and the third image to create the augmented image, such that the first image, the second image and the third image are simultaneously displayed in response to the detection of the user selection of the first graphical element.

13. The computer-readable storage medium of claim 12, wherein the combining of the first image and the second image comprises overlaying the second image on the first image within the camera interface.

14. The computer-readable storage medium of claim 12, wherein the instructions, when executed by the computer, cause the computer to present, within the camera interface, of a message portion to receive text input for a message communicated from the computing device of the first user.

15. The computer-readable storage medium of claim 14, wherein the instructions, when executed by the computer, cause the computer to generate the message to include the text input and the augmented image.

* * * * *